(12) United States Patent
Wijaya (10) Patent No.: US 9,115,865 B1
(45) Date of Patent: Aug. 25, 2015

(54) LIGHTING DEVICE HAVING LIGHT-DISTRIBUTING VOID

(71) Applicant: Hendra Wijaya, Arlington, TX (US)

(72) Inventor: Hendra Wijaya, Arlington, TX (US)

(73) Assignee: FOREVER GIFTS, INC., Grand Prairie, TX (US)

( * ) Notice: Subject to any disclaimer, the term of this patent is extended or adjusted under 35 U.S.C. 154(b) by 148 days.

(21) Appl. No.: 13/921,687

(22) Filed: Jun. 19, 2013

Related U.S. Application Data (60) Provisional application No. 61/661,537, filed on Jun. 19, 2012.

(51) Int. Cl.
    *F21V 7/04* (2006.01)
    *F21V 5/04* (2006.01)
    *F21L 4/08* (2006.01)

(52) U.S. Cl.
    CPC .. *F21V 5/045* (2013.01); *F21L 4/08* (2013.01)

(58) Field of Classification Search
    CPC .. G02B 6/0018; G02B 6/0021; G02B 6/0028; G02B 6/002; G02B 13/06; G02B 17/086; G02B 19/0066; F21K 9/50; F21K 9/52; F21K 9/135; F21V 3/02; F21V 3/04; F21V 3/08; F21V 7/0091; F21V 5/02; F21V 13/04; F21V 7/0008; F21Y 2101/002; G09F 13/02
    USPC .......... 362/23.16, 85, 183, 223, 244, 249.01, 362/249.02, 307, 308, 310, 311.01, 311.06, 362/326–329, 551, 555, 606, 608, 610–613, 362/615–617, 800, 806–812; 40/543, 547, 40/552, 553
    See application file for complete search history.

(56) References Cited

U.S. PATENT DOCUMENTS

| | | | |
|---|---|---|---|
| 2,882,782 A | 4/1959 | Welch | |
| 3,774,021 A * | 11/1973 | Johnson | 362/27 |
| 4,627,692 A * | 12/1986 | Clegg | 359/709 |
| 5,134,553 A | 7/1992 | Hasegawa | |
| 5,696,865 A * | 12/1997 | Beeson et al. | 385/146 |
| 5,746,493 A * | 5/1998 | Jonsson et al. | 362/602 |
| 5,867,772 A * | 2/1999 | Jonsson et al. | 455/575.1 |
| 5,980,063 A * | 11/1999 | Ford et al. | 362/186 |
| 6,026,283 A * | 2/2000 | Stephenson | 455/575.1 |
| 6,724,542 B2 * | 4/2004 | Lenoire et al. | 359/709 |
| 6,929,390 B2 * | 8/2005 | Amano | 362/545 |
| 6,966,685 B2 | 11/2005 | Li et al. | |
| 7,153,002 B2 * | 12/2006 | Kim et al. | 362/327 |
| 7,223,000 B2 | 5/2007 | Yamamura | |
| 7,360,938 B2 | 4/2008 | Mizuyoshi | |
| 7,534,004 B2 | 5/2009 | Chang | |
| 7,543,971 B2 * | 6/2009 | Lee et al. | 362/616 |
| 7,602,551 B2 | 10/2009 | Chi et al. | |
| 7,737,636 B2 | 6/2010 | Li et al. | |
| 7,806,547 B2 * | 10/2010 | Benitez et al. | 362/97.3 |
| 8,061,857 B2 | 11/2011 | Liu et al. | |
| 8,534,894 B2 * | 9/2013 | Lin et al. | 362/606 |
| 2003/0156819 A1 * | 8/2003 | Pruss et al. | 385/146 |
| 2007/0062793 A1 * | 3/2007 | Hung | 200/310 |
| 2007/0147760 A1 | 6/2007 | Iimura | |
| 2008/0101083 A1 * | 5/2008 | Lee et al. | 362/610 |

(Continued)

*Primary Examiner* — Hargobind S Sawhney
(74) *Attorney, Agent, or Firm* — Belair Intellectual Property Law LLC (57) ABSTRACT

A lighting device includes a lens portion and a base portion. The lens portion includes at least one light-distributing void for distributing light throughout the lens portion. The base portion includes a light source for emitting light into the lens portion.

21 Claims, 11 Drawing Sheets

(56) References Cited

U.S. PATENT DOCUMENTS

2009/0237943 A1* 9/2009 Schmidt et al. .......... 362/311.02
2012/0113625 A1* 5/2012 Werner et al. ................. 362/183
2013/0308338 A1* 11/2013 Lin et al. ...................... 362/609

* cited by examiner

LIGHTING DEVICE HAVING LIGHT-DISTRIBUTING VOID

CROSS-REFERENCE TO PRIORITY APPLICATION

This application hereby claims the benefit of U.S. Provisional Patent Application No. 61/661,537 for a "Lighting Device Having Light-Distributing Void" (filed Jun. 19, 2013, at the United States Patent and Trademark Office), which is hereby incorporated by reference in its entirety.

FIELD OF INVENTION

The present invention relates to lighting devices.

BACKGROUND OF THE INVENTION

Homeowners commonly employ various types of indoor and outdoor lighting. Small indoor and outdoor lamps are commonly used for decoration. In addition, outdoor lamps may be used to illuminate gardens, footpaths, or driveways. Outdoor lamps are typically wired or powered by solar energy.

Most lamps employ a lens having a simple spherical or bulb-like shape. However, consumers increasingly desire lamps, particularly outdoor lamps having unique and complex shapes and designs for aesthetic purposes. Accordingly, a need exists for improved lighting devices.

SUMMARY OF THE INVENTION

In one aspect, the present invention embraces a lighting device that includes a lens portion (e.g., formed from a transparent or translucent plastic material) and a base portion that is configured to mate with the lens portion. The lens portion includes at least one light-distributing void to help distribute light (e.g., by reflection and/or refraction) throughout the lens portion. The base portion includes a light source (e.g., a light emitting diode or a low-voltage incandescent bulb) for emitting light into the lens portion. The lens portion may include an extended portion having an embossed rim. Furthermore, the base portion may include a cavity having a debossed rim for receiving the extended portion.

In another aspect, the present invention embraces a method of making a light device. The method includes forming a lens of a predetermined shape (e.g., from a transparent or translucent plastic material). The lens includes one or more void areas (e.g., voids) having a triangular or diamond-like shape. The void areas are positioned within the lens to help distribute light throughout substantially the entire lens.

DETAILED DESCRIPTION

In one aspect, the present invention embraces a lighting device that employs a light distributing void.

An exemplary lighting device 10 is depicted in FIGS. 1-6. The lighting device 10 includes a lens portion 11, a base portion 12, and a light-distributing void 13 within the lens portion 11.

Figure 1:
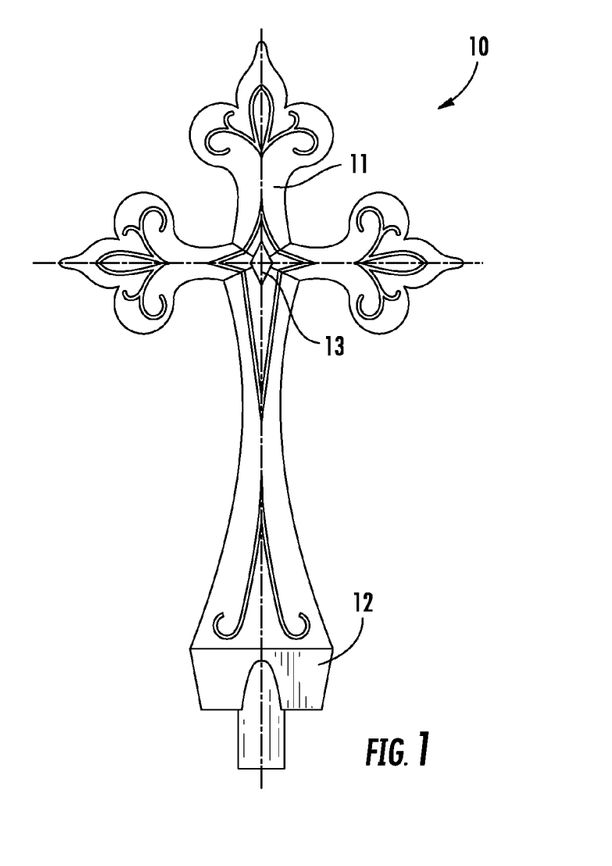
FIG. 1 depicts a front view of a lighting device in accordance with the present invention.
Figure 2:
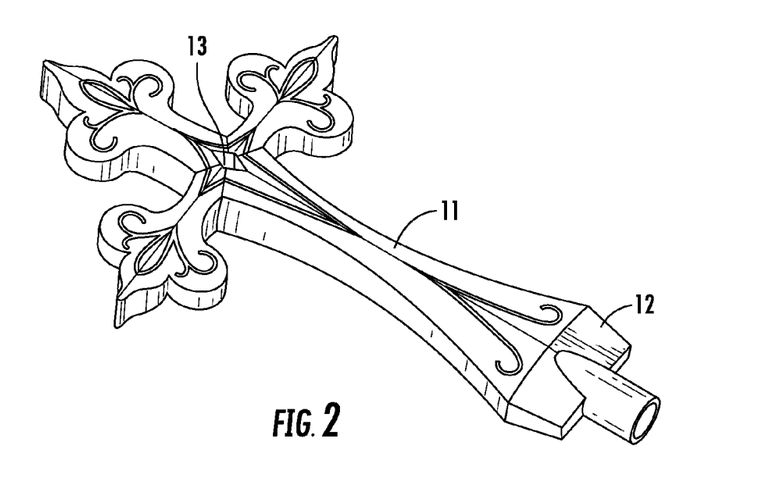
FIG. 2 depicts an axonometric projection of a lighting device in accordance with the present invention.
Figure 3:
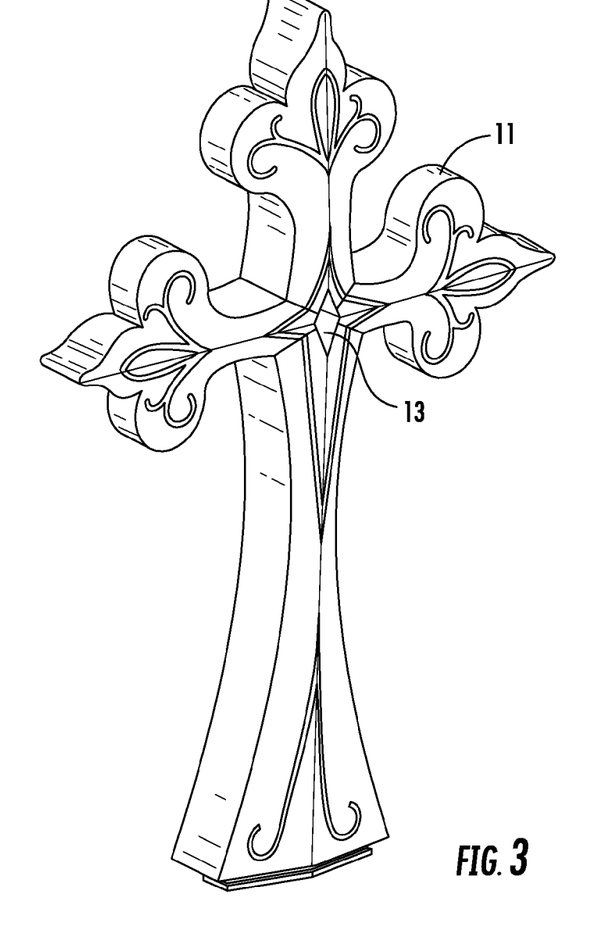
FIG. 3 depicts another axonometric projection of a lighting device in accordance with the present invention.

FIG. 1 depicts the lens portion 11 as having a decorative cross shape. That said, it is within the scope of the present invention for the lens portion 11 to assume other shapes.

The lens portion is typically formed from a transparent thermoplastic material (e.g., acrylic glass). Other transparent materials (e.g., silicate glass) and translucent materials, however, are within the scope of the present invention.

Figure 4:
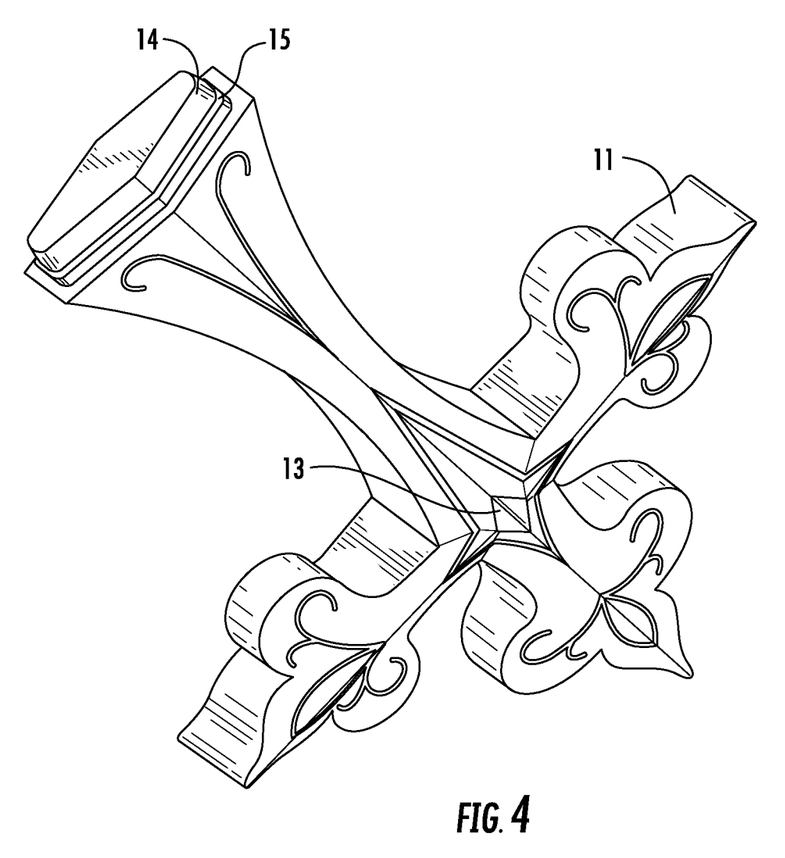
FIG. 4 depicts the lens portion of a lighting device in accordance with the present invention.
Figure 5:
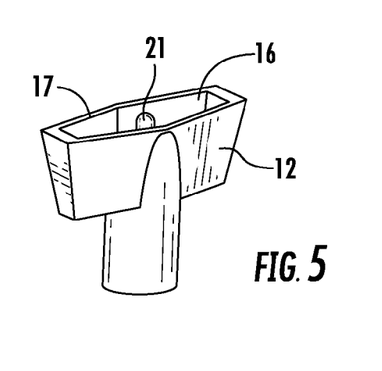
FIG. 5 depicts the base portion of a lighting device in accordance with the present invention.

The lens portion 11 is typically capable of being removably attached to the base portion 12. Accordingly, the base portion 12 is configured to mate with the lens portion. In this regard, the lens portion 11 typically includes an extended portion 14 having an embossed rim 15 as depicted in FIG. 4. The base portion 12 typically has a corresponding cavity 16 and debossed rim 17 for receiving the extended portion 14 and embossed rim 15 as depicted in FIG. 5. The embossed rim 15 fits within the debossed rim 17 to secure the extended portion 14 within the cavity 16 without the need for a more permanent fastener (e.g., glue). In an alternative embodiment, the extended portion 14 may have a debossed rim and the cavity 16 may have an embossed rim.

As depicted in FIG. 5, the base portion 12 includes a light source 21 for illuminating the lens portion 11. In a typical embodiment, the light source 21 is a light emitting diode (LED). That said, the use of other light sources (e.g., an incandescent bulb) are within the scope of the present invention.

Figure 6:
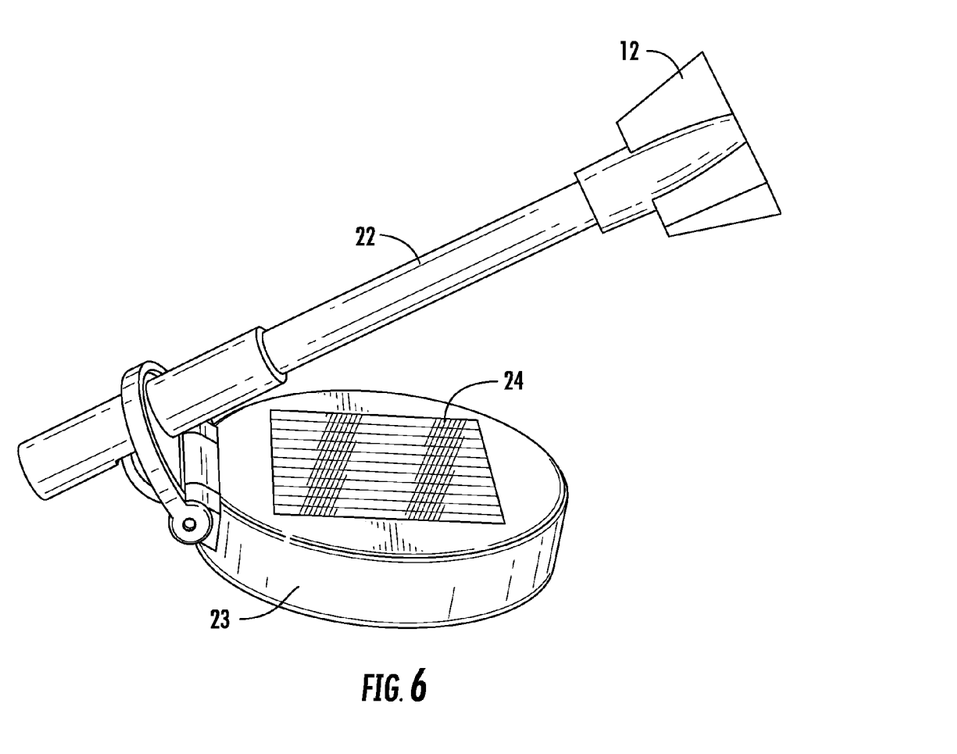
FIG. 6 depicts the base portion being connected to a power supply having a solar panel.
Figure 7:
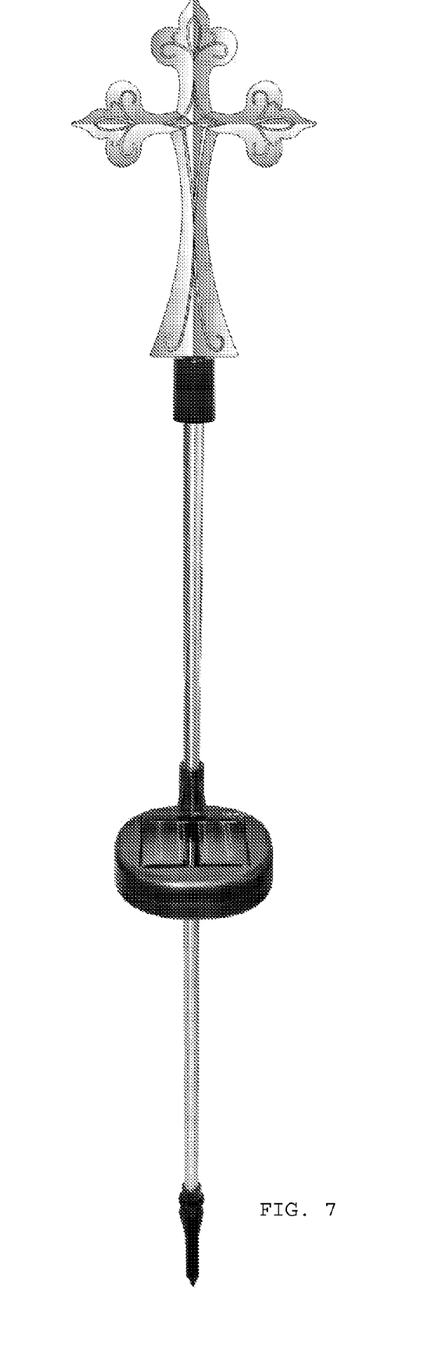
FIG. 7 depicts a lighting device being attached to a pole for securing the lighting device in the ground.
Figure 8A:
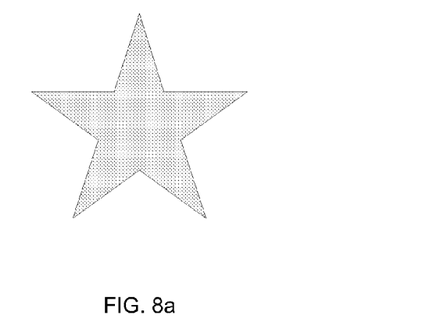
FIGS. 8a-8d depict various light-distributing-void shapes in accordance with the present invention.
Figure 8B:
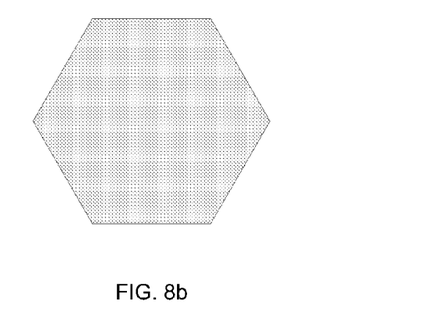
Figure 8C:
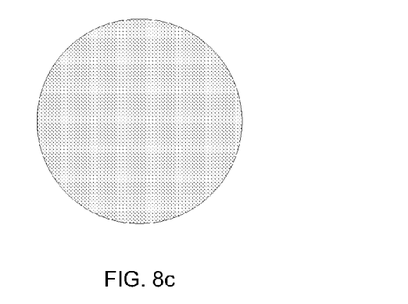
Figure 8D:
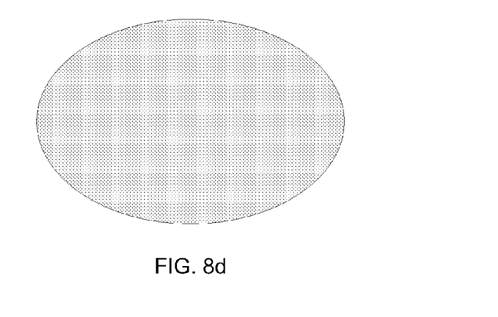
Figure 9A:
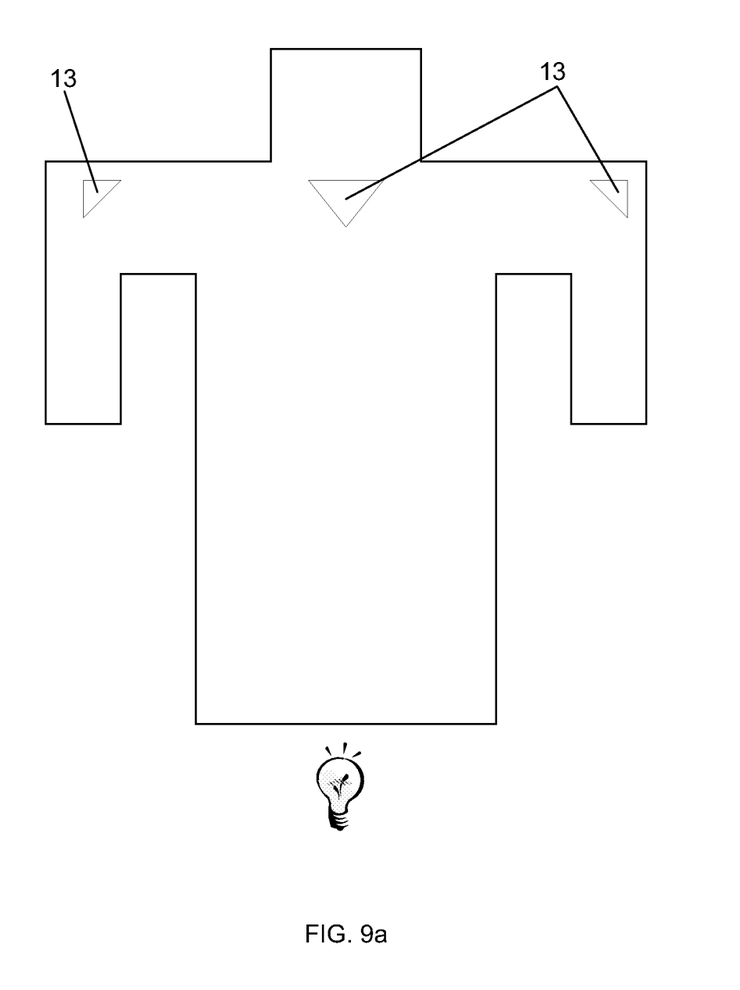
FIGS. 9a-9e depict various shapes for lighting devices having a plurality of voids in accordance with the present invention.
Figure 9B:
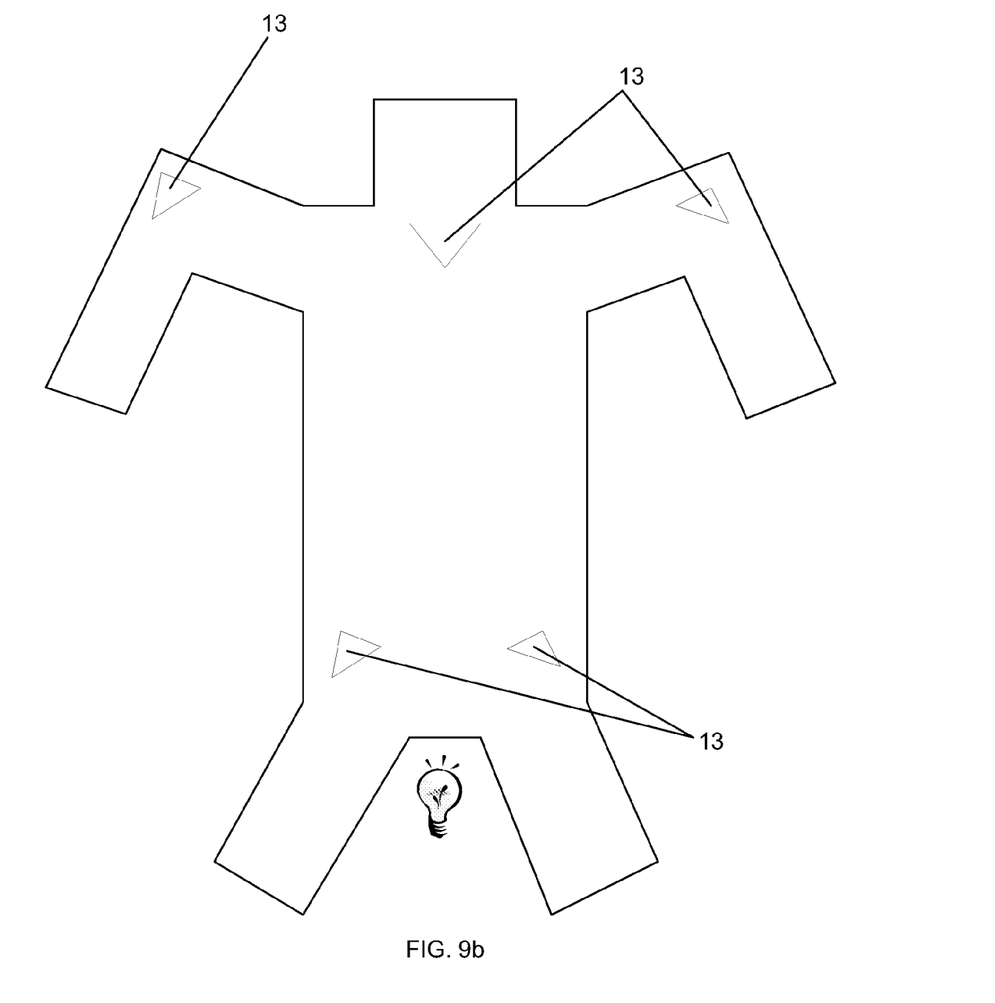
Figure 9C:
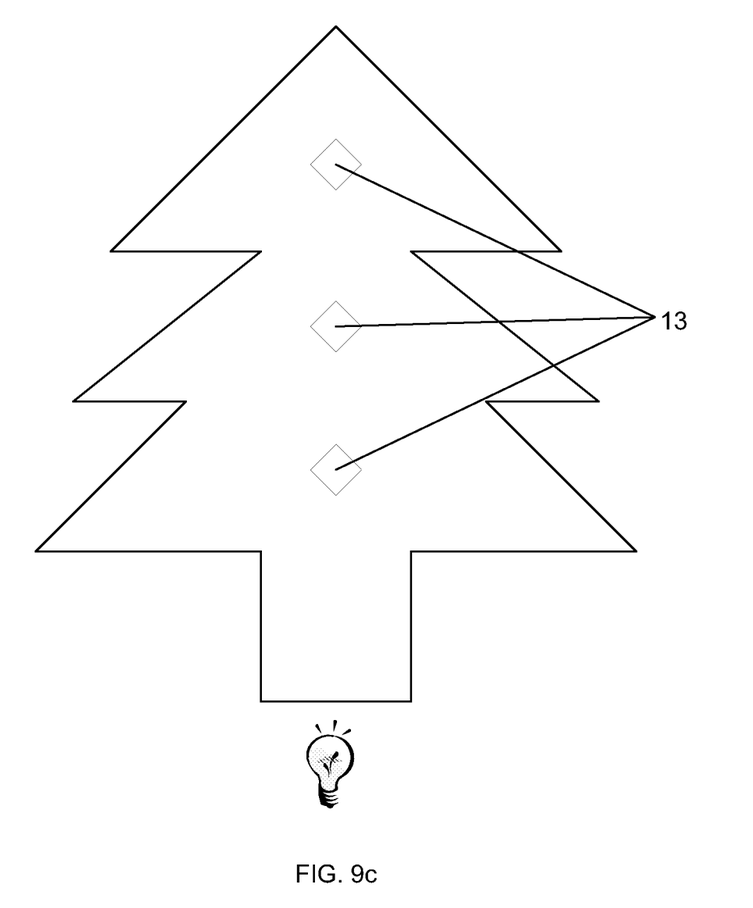
Figure 9D:
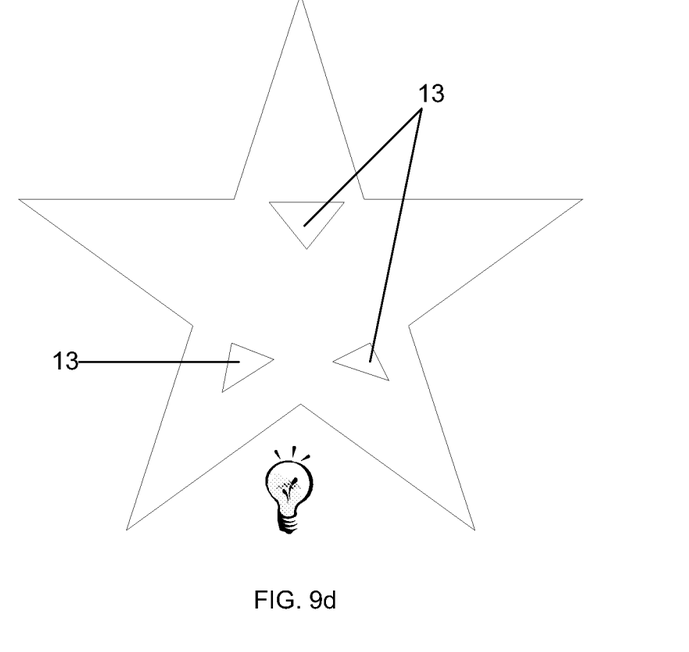
Figure 9E:
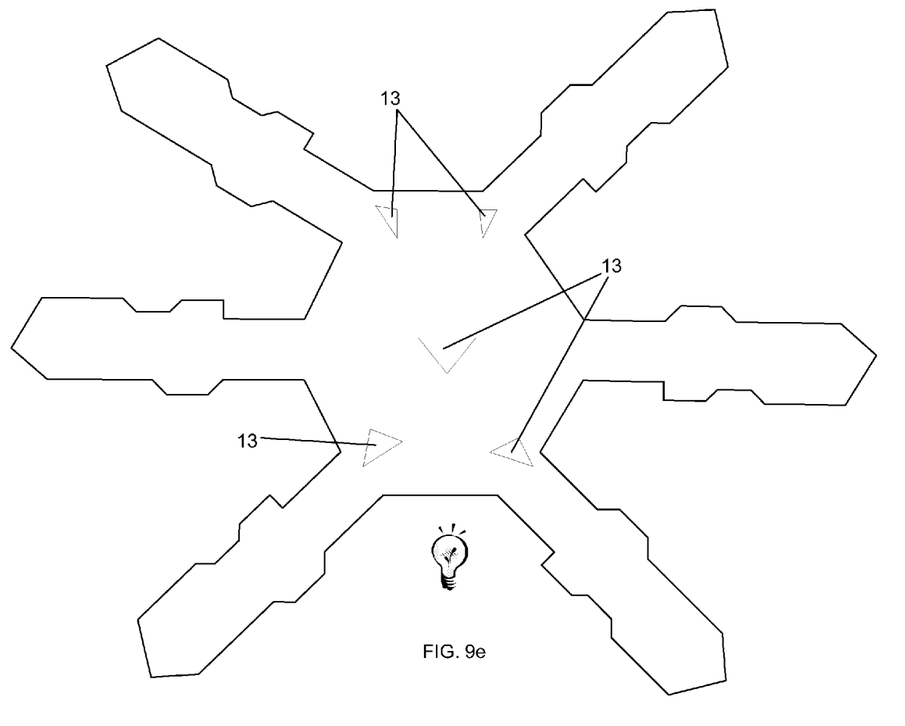

The lighting device 10 typically includes one or more batteries (e.g., disposable or rechargeable batteries) that supply power to the light source 21. More typically, the lighting device 21 includes one or more rechargeable batteries connected to one or more solar panels. As depicted in FIG. 6, a top pole portion 22 may connect the base portion 12 to a power supply 23. One or more batteries are typically positioned within the power supply 23. One or more solar panels 24 may be used to charge the batteries, which are electrically connected to the light source 21. An on-off switch may be used to activate the light source 21. As depicted in FIG. 7, the top pole portion 22 may be connected to a bottom pole portion, which can be used to secure the lighting device 10 in the ground.

In an alternative embodiment, the lighting device 10 may include a plug for connecting the light source 21 to a socket supplying electricity (e.g., 120 volt AC). A transformer may be used to reduce the voltage of supplied electricity.

As noted, the lens portion 11 includes at least one light-distributing void 13. The light-distributing void 13 helps to distribute light provided by the light source 21 throughout the lens portion 11. In other words, the light-distributing void reflects and/or refracts light to parts of the lens portion 11 where a sufficient amount of light would not reach without the void. To facilitate light distribution the light-distributing void 13 typically has a triangular or diamond-like shape. Alternative void shapes are within the scope of the present invention. For example, the light-distributing void 13 may have a starlike, hexagonal, round, or oval shape. In this regard, various alternative light-distributing-void shapes in accordance with the present invention are depicted in FIGS. 8a-8d.

The light-distributing void directs light (e.g., by reflection and/or refraction) to ensure that it is distributed substantially throughout the lens portion. For example, the light-distributing void 13 depicted in FIG. 1 reflects a portion of the light from the light source 21 into the left portion and the right portion of the lens 11. As depicted in FIG. 1, the light-distributing void 13 has a 2:1 height h to width w ratio. That said, it within the scope of the present invention for the light-distributing void to have other dimensions.

In one embodiment of the present invention, the lens portion may employ a plurality of light-distributing voids. In this regard, FIGS. 9a-9e depict various lens portions that have a plurality of light-distributing voids.

Depending upon the size and/or shape of the lens portion, multiple light-distributing voids may be used to distribute light throughout the lens portion. One void may be placed in the lens to reflect and/or refract light to one or more other voids positioned in the lens. For example, a first triangular-shaped void may be positioned in the middle portion of the lens to reflect and/or refract light to a second triangular-shaped void that is positioned a predetermined distance and a predetermined angle from the first void such that the second triangular-shaped void reflects and/or refracts light to a portion of the lens that would not receive a sufficient amount of light from the light source or from the first triangular-shaped void. In another embodiment, as shown in FIG. 7, a first triangular-shaped void may be positioned in the middle portion of the lens to reflect and/or refract light to second and third triangular-shaped voids that are positioned at a predetermined distance and at a predetermined angle from the first void such that the second and third triangular-shaped voids reflect and/or refract light to one or more portions of the lens that would not receive light from the light source or from the first triangular-shaped void.

In another aspect, the present invention embraces a method of creating a lens portion for a lighting device.

First the desired shape (e.g., a decorative cross) of the lens portion should be determined. The shape of the lens portion may be selected for functional and/or aesthetic reasons.

Next, the size, shape, and placement of one or more light-distributing voids should be determined. The characteristics of the light-distributing voids should be selected to ensure that light will be substantially distributed throughout the lens portion. For example, one void of a predetermined size and shape may be positioned in the lens to reflect and/or refract light from a light source to one or more areas of the lens that would not receive light directly from the light source. If the first void would not reflect and/or refract light to all areas of the lens that would not receive sufficient light from the light source, then a second void of a predetermined size and shape may be positioned at a predetermined distance and at a predetermined angle from the first void to reflect and/or refract light to one or more areas of the lens that would not receive light directly from the light source or light that is reflected and/or refracted from the first void. Lens having complex shapes may employ two, three, four, five, or six or more voids to distribute light throughout the lens.

A mold of the lens portion, including the light-distributing voids, is then created. Once the mold has been created, the lens portion can be created by pouring the lens material (e.g., acrylic glass) into the mold and thereafter allowing the material to harden.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A lighting device comprising:
   a lens portion having a predetermined shape and an extended portion having at least one of an embossed rim or debossed rim, said lens portion comprising at least one light-distributing void to help distribute light throughout said lens portion for emitting the light outside of the entirety of the lighting device; and
   a base portion configured to mate with said lens portion, said base portion having a cavity having at least one of an embossed rim and a debossed rim that corresponds to said at least one embossed rim and debossed rim of the extended portion for removing and securing said extended portion within the cavity, said base portion comprising a light source for emitting light into said lens portion.

2. A lighting device according to claim 1 wherein said lens portion comprises a first void having a predetermined size and shape and a second void having a predetermined size and shape, said second void being positioned at a predetermined distance and at a predetermined angle from said first void.

3. A lighting device according to claim 1 wherein said lens portion comprises a first void having a predetermined size and shape, a second void having a predetermined size and shape, said second void being positioned at a predetermined distance and at a predetermined angle from said first void, and a third void having a predetermined size and shape, said third void being positioned at a predetermined distance and at a predetermined angle from at least one of said first void and said second void.

4. A lighting device according to claim 1, wherein said lens portion comprises a plurality of light-distributing voids.

5. A lighting device according to claim 4, wherein said plurality of light-distributing voids comprises light-distributing voids of at least two different shapes.

6. A lighting device according to claim 4, wherein at least one of said light-distributing voids directs at least a portion of the light emitted by said light source toward at least another of said light-distributing voids.

7. A lighting device according to claim 1, comprising one or more batteries for supplying power to said light sources.

8. A lighting device according to claim 7, comprising one or more solar panels for charging said one or more batteries.

9. A lighting device according to claim 1, wherein said lens portion comprises a transparent plastic material.

10. A lighting device according to claim 1, wherein said lens portion comprises a translucent plastic material.

11. A lighting device according to claim 1, wherein said light-distributing void has a triangular shape.

12. A lighting device according to claim 1, wherein said light-distributing void has a diamond-like shape.

13. A lighting device according to claim 1, wherein said light-distributing void has a hexagonal shape.

14. A lighting device according to claim 1, wherein said light-distributing void has a round shape.

15. A lighting device according to claim 1, wherein said light-distributing void has a diamond-like shape with a 2:1 height to width ratio.

16. A lighting device according to claim 1, wherein said light source comprises a light emitting diode.

17. A method of making a lighting device comprising:
forming a lens of a predetermined shape from a transparent or translucent material, said lens having an extended portion having at least one of an embossed rim and a debossed rim;
including in the lens one or more void areas having a predetermined shape, the one or more voids being positioned within the lens to help distribute light throughout substantially the entire lens; forming a base portion configured to mate with the extended portion, said base portion having a cavity having at least one of an embossed rim and a debossed rim that corresponds to said at least one embossed rim debossed rim of the extended portion; providing a light source in said base portion; and inserting the extended portion into the base portion.

18. A method according to claim 17, wherein forming the lens includes one or more voids having a triangular shape.

19. A method according to claim 17, wherein forming the lens includes one or more voids having a diamond-like shape.

20. A method according to claim 17 wherein the step of including in the lens one or more voids comprises a first void having a predetermined size and shape and a second void having a predetermined size and shape, the second void being positioned at a predetermined distance and angle from the first void.

21. A method according to claim 17 wherein the step of including in the lens one or more void comprises a first void having a predetermined size and shape, a second void having a predetermined size and shape, the second void being positioned at a predetermined distance and angle from the first void, and a third void having a predetermined size and shape, the third void being positioned at a predetermined distance and angle from at least one of the first void and second void.

* * * * *